United States Patent
Thomas et al.

(10) Patent No.: US 10,846,757 B2
(45) Date of Patent: Nov. 24, 2020

(54) AUTOMATED SYSTEM AND METHOD FOR CREATING MACHINE-GENERATED ADVERTISEMENTS

(71) Applicant: MotiveMetrics Inc., Stoneham, MA (US)

(72) Inventors: Kyle A. Thomas, Vallejo, CA (US); Frank G. Slaughter, III, Palo Alto, CA (US); Stenli Duka, Mountain View, CA (US); Emilie I. Slaughter, Palo Alto, CA (US)

(73) Assignee: MotiveMetrics Inc., Stoneham, MA (US)

( * ) Notice: Subject to any disclaimer, the term of this patent is extended or adjusted under 35 U.S.C. 154(b) by 184 days.

(21) Appl. No.: 15/925,408

(22) Filed: Mar. 19, 2018

(65) Prior Publication Data

US 2018/0276718 A1    Sep. 27, 2018

Related U.S. Application Data

(60) Provisional application No. 62/476,183, filed on Mar. 24, 2017.

(51) Int. Cl.
*G06Q 30/02* (2012.01)
*G06N 20/00* (2019.01)
(Continued)

(52) U.S. Cl.
CPC ......... *G06Q 30/0276* (2013.01); *G06F 40/20* (2020.01); *G06F 40/56* (2020.01);
(Continued)

(58) Field of Classification Search
CPC combination set(s) only.
See application file for complete search history.

(56) References Cited

U.S. PATENT DOCUMENTS

| | | |
|---|---|---|
| 2008/0255915 A1 | 10/2008 | Collins et al. |
| 2008/0300971 A1* | 12/2008 | Zeng ............ G06Q 30/02 705/14.41 |

(Continued)

OTHER PUBLICATIONS

International Search Report from PCT/US2018/023161, dated May 3, 2018.

*Primary Examiner* — Alexandru Cirnu
(74) *Attorney, Agent, or Firm* — Morse, Barnes-Brown & Pendleton, P.C.; Sean D. Detweiler, Esq.

(57) ABSTRACT

A system and process provide a novel methodology to improve advertising performance by creating and testing new ad copy within advertisements more effectively and efficiently. The system includes an automated technology that produces a virtually unlimited number of predictably high-quality machine-generated advertisements, by combining and recombining the words and phrases (e.g., ad copy) that have proven to be most effective in previous advertisements with new words and phrases that are determined as likely to be effective based on the motivations of the target audience that will be viewing the advertisements. The novel technology is a combined order of specific rules that renders information into a specific format that is then used and applied to create desired results in the form of top performing ad copy and top performing machine-generated advertisements.

22 Claims, 7 Drawing Sheets

(51) Int. Cl.
*G06F 40/20* (2020.01)
*G06F 40/56* (2020.01)

(52) U.S. Cl.
CPC ......... *G06N 20/00* (2019.01); *G06Q 30/0243* (2013.01); *G06Q 30/0244* (2013.01)

(56) References Cited

U.S. PATENT DOCUMENTS

| | | | |
|---|---|---|---|
| 2009/0276309 A1* | 11/2009 | Otto | G06Q 30/02 705/14.25 |
| 2011/0055008 A1 | 3/2011 | Feuerstein et al. | |
| 2011/0313845 A1* | 12/2011 | Richardson | G06Q 30/0244 705/14.42 |
| 2014/0040011 A1 | 2/2014 | Kim | |
| 2014/0114746 A1* | 4/2014 | Pani | G06Q 10/067 705/14.45 |
| 2016/0071162 A1* | 3/2016 | Ogawa | G06Q 30/0269 705/14.66 |

* cited by examiner

AUTOMATED SYSTEM AND METHOD FOR CREATING MACHINE-GENERATED ADVERTISEMENTS

CROSS-REFERENCE TO RELATED APPLICATION(S)

This application claims priority to, and the benefit of, U.S. Provisional Application No. 62/476,183, filed Mar. 24, 2017, for all subject matter common to both applications. The disclosure of said provisional application is hereby incorporated by reference in its entirety.

FIELD OF THE INVENTION

The present invention relates to a new machine-generated advertisement technology. In particular, the present invention relates to a technology for optimizing digital advertising performance by implementing a new process using software on a machine to generate advertisements from improved ad copy in an automated high-throughput process to determine the most effective machine-generated advertisement(s), which can then be utilized for creating optimized advertisements based on the output of the system and method.

BACKGROUND

Generally, conventional methods for optimizing ad copy have or implement processes of manual ad copy creation by human copywriters, and A/B testing of a limited number of ads, either manually or with the assistance of A/B testing software. Current technology does not provide a reliable method for efficiently generating ad copy at scale with consistently predictable performance. Developing new ad copy is currently done manually through a combination of guesswork and trial and error, which has shortcomings. First, these methods are largely based on a copywriter's best guess as to what ad copy might be effective, and thus quality is unreliable and unpredictable. Second, writing ad copy manually is laborious, and time and resource intensive. Third, new ad copy creation is typically limited by the imagination and limitations of human copywriters. All of these factors result in an advertisement development process that is slow, uncertain, and costly, is limited by the time, resources, imaginations, and ingenuity of human copywriters, and that typically offers little to no return on investment.

Newly developed advertisements, utilizing the ad copy, are typically evaluated using an A/B testing methodology, in which one or two new advertisements are run against some baseline, such as existing high-performing advertisement(s). The data is then typically monitored and assessed either manually (e.g., downloading spreadsheets from the Google AdWords platform), or by using A/B testing platforms such as the Optimizely® experimentation platform offered by Optimizely Inc. of San Francisco, Calif. Furthermore, typically tests are run in single units of an account (e.g., an AdWords ad group) because aggregating data from multiple such units is difficult, error-prone, and extremely time-intensive. All of these factors limit an amount of new ad copy that can be explored and evaluated in a given period of time. Furthermore, to reliably test more than just a few new advertisements, typically multiple sequential A/B tests must be run, as opposed to testing many new advertisements in parallel. Lastly, because tests are typically run in single units of an account, this generally limits the proportion of the account that can be optimized, because each unit must be optimized independently, if it is optimized at all (e.g., often ads from one area of an account will simply be dropped into other areas of an account, and not really optimized at all).

Taken together, all of the above limit: (1) the amount of new ad copy variations that can be created, (2) the amount of testing that can be done to discover the best new ad copy variants once advertisements are created utilizing the ad copy, and (3) the amount of the account that can be optimized (e.g., often these constraints lead people to only optimize high-volume areas of their account and neglect the "long-tail" areas where data is more sparse). In summary, it is nearly impossible to recoup the resources invested in trying to optimize ad copy through current processes because both creating and testing new ad copy is prohibitively resource-intensive, and because the performance of new advertisements is unreliable and unpredictable, account performance frequently suffers during the testing process with no guaranteed benefit.

SUMMARY

There is a need for a reliable and efficient process for creating and optimizing ad copy in a predictable way to achieve desired results in digital advertising environments. The present invention is directed toward further solutions to address this need, in addition to having other desirable characteristics. Specifically, the system and process of the present invention provides a novel methodology to improve advertising performance by creating and testing new ad copy within advertisements more effectively and efficiently than current technology and methods allow. The core of the system is an automated tool that produces a virtually unlimited number of predictably high-quality machine-generated advertisements, by combining and recombining the words and phrases (e.g., ad copy) that have proven to be most effective in previous advertisements with new words and phrases that are determined as likely to be effective based on the motivations of the target audience that will be viewing the advertisements. The novel process is a combined order of specific rules that renders information into a specific format that is then used and applied to create desired results in the form of top performing ad copy and top performing machine-generated advertisements.

The motivations of the target audience are identified through publicly available text data sourced from online environments, to create psychological profiles of the target audience (e.g., the group of people that use a specific search term), and these motivations are associated with proprietary banks of words and phrases that appeal to each motivation. The most effective words and phrases from previous advertisements are assessed by training machine-learning algorithms along with the historical performance data of all advertisements that have ever been run in an account (as well as similar global ad data from many accounts). The machine-generated advertisements that combine these two sources of words and phrases (historical performance and motivations) are then evaluated using a high-throughput multivariate testing methodology, in which many new ads are tested in parallel to identify the top-performing advertisements. This process can also be done iteratively for continuous optimization of the advertisements.

In accordance with example embodiments of the present invention, a machine-generated method is provided. The machine-generated method includes assessing a digital advertising account comprising one or more ad units. Assessing includes analyzing keyword organizational structure and historic data of one or more historical advertisements associated with the one or more ad units in the digital advertising account to calculate performance data indicating relative effectiveness of specific copy elements that appeared in the one or more historical advertisements. A motivational analysis is performed for each of the one or more ad units to identify motivational trigger words or phrases in the one or more historical advertisements associated with the one or more ad units that are associated with one or more motivations, and thereby identify the one or more motivations associated with each of the one or more ad units. The one or more ad units are grouped into sets of optimization groupings based on intersecting motivations from the one or more motivations. A collection of ad copy elements are identified to be used in new advertisements for each of the optimization groupings based the performance data and the one or more motivations by aggregating the specific copy elements having relatively greater effectiveness according to the performance data and motivational trigger words or phrases associated with the one or more motivations. A plurality of new machine-generated advertisements are generated for each of the optimization groupings utilizing the aggregated specific copy elements. The plurality of new machine-generated advertisements are added to one or more ad units within the optimization groupings. The high-throughput testing process is performed utilizing the one or more historical advertisements and the plurality of new machine-generated advertisements within the optimization groupings. A result of the high-throughput testing is output, the result including at least one top performing advertisement for each of the one or more ad units within the optimization groupings.

In accordance with aspects of the present invention, the step of assessing includes assessing keyword organizational structure and historical data for all advertisements previously run for the digital advertising account. The method can further include training predictive scoring models with the historical data for each of the optimization groupings. The method can further include performing another motivational analysis for each of the optimization groupings. The collection of ad copy elements can be used as raw materials for generating the plurality of new machine-generated advertisements for each of the optimization groupings. The method can further include training natural language generation algorithms to determine how text is stylized in the plurality of new machine-generated advertisements. The method can further include generating the plurality of new machine-generated advertisements based on the trained natural language generation algorithms.

In accordance with aspects of the present invention, the method can further include updating assessment modules to incorporate the result of the high-throughput testing, and utilizing the at least one top performing advertisement as a seed for generating future machine-generated advertisements.

In accordance with aspects of the present invention, the method can further include performing the motivational analysis by defining a target audience, aggregating publically available text data for users included in the target audience, creating psychological trait profiles for each of the users, aggregating trait profiles to derive motivations for each of the users, and linking the derived motivations for each of the users with the motivational trigger words and phrases to be utilized in the collection of ad copy elements.

In accordance with aspects of the present invention, the high-throughput testing further includes manipulating the plurality of new machine-generated advertisements to satisfy a predetermined advertisements format or user specified goal, scoring the plurality of new machine-generated advertisements and the one or more historical advertisements for a predicted performance, and filtering out advertisements from the plurality of new machine-generated advertisements and the one or more historical advertisements that are predicted to perform poorly based on the predicted performance.

In accordance with aspects of the present invention, the high-throughput testing process can include identifying all of the plurality of new machine-generated advertisements and the one or more historical advertisements in each of the optimization groupings, tracking performance metrics for each of the new plurality of machine-generated advertisements and the one or more historical advertisements in each of the optimization groupings, aggregating test data from the performance metrics, identifying over performing and underperforming advertisements by continuously calculating decision-rule statistics for each of the performance metrics, removing the underperforming advertisements and continuing the high-throughput testing process for the remaining advertisements of the new plurality of machine-generated advertisements and the one or more historical advertisements until a final predetermined number of advertisements remain, and identifying the final predetermined number of advertisements as the at least one top performing advertisement.

In accordance with example embodiments of the present invention, a system is provided. The system includes a processing unit configured to assess a digital advertising account comprising one or more ad units. Assessing includes analyzing keyword organizational structure and historic data of one or more historical advertisements associated with the one or more ad units in the digital advertising account to calculate performance data indicating relative effectiveness of specific copy elements that appeared in the one or more historical advertisements. A motivational analysis is performed for each of the one or more ad units to identify motivational trigger words or phrases in the one or more historical advertisements associated with the one or more ad units that are associated with one or more motivations, and thereby identify the one or more motivations associated with each of the one or more ad units. The one or more ad units are grouped into sets of optimization groupings based on intersecting motivations from the one or more motivations. A collection of ad copy elements are identified to be used in new advertisements for each of the optimization groupings based the performance data and the one or more motivations by aggregating the specific copy elements having relatively greater effectiveness according to the performance data and motivational trigger words or phrases associated with the one or more motivations. A plurality of new machine-generated advertisements are generated for each of the optimization groupings utilizing the aggregated specific copy elements. The plurality of new machine-generated advertisements are added to one or more ad units within the optimization groupings. The high-throughput testing process is performed utilizing the one or more historical advertisements and the plurality of new machine-generated advertisements within the optimization groupings. A result of the high-throughput testing is output, the result including at least one top performing advertisement for each of the one or more ad units within the optimization groupings.

In accordance with aspects of the present invention, the step of assessing includes assessing keyword organizational structure and historical data for all advertisements previously run for the digital advertising account. The processing unit can be further configured to train predictive scoring models with the historical data for each of the optimization groupings. The processing unit can be further configured to perform another motivational analysis for each of the optimization groupings. The collection of ad copy elements can be used as raw materials for generating the plurality of new machine-generated advertisements for each of the optimization groupings. The processing unit can be further configured to train natural language generation algorithms to determine how text is stylized in the plurality of new machine-generated advertisements. The processing unit can be further configured to generate the plurality of new machine-generated advertisements based on the trained natural language generation algorithms.

In accordance with aspects of the present invention, the processing unit can be further configured to update assessment modules to incorporate the result of the high-throughput testing, and utilizing the at least one top performing advertisement as a seed for generating future machine-generated advertisements.

In accordance with aspects of the present invention, the processing unit can be further configured to perform the motivational analysis by defining a target audience, aggregating publically available text data for users included in the target audience, creating psychological trait profiles for each of the users, aggregating trait profiles to derive motivations for each of the users, and linking the derived motivations for each of the users with the motivational trigger words and phrases to be utilized in the collection of ad copy elements.

In accordance with aspects of the present invention, the high-throughput testing further includes manipulating the plurality of new machine-generated advertisements to satisfy a predetermined advertisements format or user specified goal, scoring the plurality of new machine-generated advertisements and the one or more historical advertisements for a predicted performance, and filtering out advertisements from the plurality of new machine-generated advertisements and the one or more historical advertisements that are predicted to perform poorly based on the predicted performance.

In accordance with aspects of the present invention, the high-throughput testing process can include identifying all of the plurality of new machine-generated advertisements and the one or more historical advertisements in each of the optimization groupings, tracking performance metrics for each of the new plurality of machine-generated advertisements and the one or more historical advertisements in each of the optimization groupings, aggregating test data from the performance metrics, identifying over performing and underperforming advertisements by continuously calculating decision-rule statistics for each of the performance metrics, removing the underperforming advertisements and continuing the high-throughput testing process for the remaining advertisements of the new plurality of machine-generated advertisements and the one or more historical advertisements until a final predetermined number of advertisements remain, and identifying the final predetermined number of advertisements as the at least one top performing advertisement.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
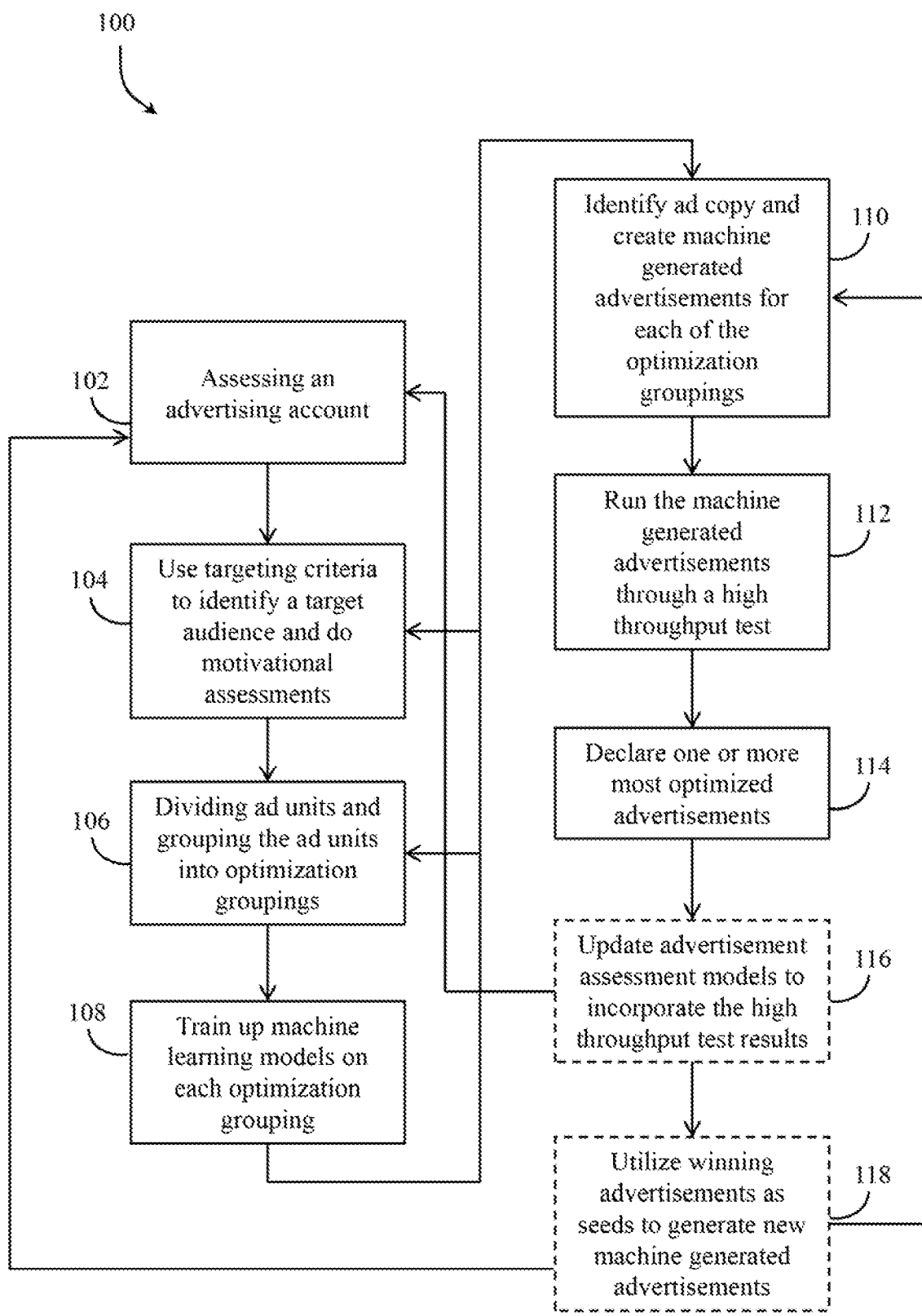
FIG. 1 is an illustrative flowchart depicting operation of the optimization system, in accordance with embodiments of the present invention.

An illustrative embodiment of the present invention relates to a process and system for efficiently and predictably improving advertisement performance over a digital advertising account by using software and hardware to implement a combined order of specific rules that renders information into a specific format that is then used and applied to create desired results in the form of top performing ad copy and top performing machine-generated advertisements at the scale needed to be profitable in digital environments (altogether this is the optimization process). The system achieves the optimization process by executing training machine-learning algorithms on ad copy with associated historical performance data and psychological data on motivations for the target audience to rapidly produce large numbers of software-generated advertisements with predictable performance. In particular, the process is designed for managing, improving, and optimizing ad copy across an entire advertising account by using statistical and psychological methods to divide the account up into coherent chunks that can be managed and optimized. The present invention employs a novel, high-throughput testing process, along with customized data tracking software to enable continuous optimization across an entire account in parallel.

Overall, the present invention is made up from a combination of functional elements that perform specific steps and functions to yield the improved result of optimized advertisements utilizing machine-generated advertisements generated from specific ad copy. Specifically, the system includes an automated process for dividing a digital advertising account up into 'optimization groupings' that combine multiple units (e.g., multiple AdWords ad groups) of an account based on motivational coherence, and statistical properties of the units being combined to enable efficient ad copy optimization across the entire account. Additionally, the system will account for semantic coherence such that similar products, services, etc. will be grouped together within the optimization groupings. Thereafter, the system includes software for assessing and processing all existing performance data in a digital advertising account or environment to reveal what ad copy has historically been most effective in digital advertisements, and creates models that can reliably predict what advertisements will be most effective (a combination of new advertisements and/or previously existing advertisements). The software then uses all the historical performance data from the advertising account to train up predictive scoring models through machine-learning algorithms, and these predictive scoring models are used to both provide historically-high-performing words and phrases for the advertisement generation software, which are also used to score the advertisements produced by the advertisement generation software.

Additionally, the system includes automated processes for identifying the key motivations of a target audience (e.g., a group of people that use a specific search query), and deliver new ad copy that appeals to these motivations of this group of people. The motivational analysis also provides the words and phrases to the advertisement generation software. Thereafter, advertisement generation software rapidly and efficiently produces massive numbers of machine-generated advertisements, not previously achievable, with predictably high performance through natural language generation algorithms that utilize ad copy from the assessing software and the automated motivational analysis processes. Once the finalized advertisements are created and stored within the advertisement account to be run, the data tracking software initializes. Thereafter, the system implements an automated high-throughput testing methodology for evaluating the performance of the newly generated advertisements, in parallel, often using data aggregated from multiple units in an account. This data tracking software tracks, manages, and analyzes the data from the testing process in an optimization grouping as the data comes in. The data tracking software uses statistical decision-rules to pause the lowest performing advertisements as the test proceeds, until only one or more advertisement(s) remains, and this advertisement(s) is declared the winner, the test terminates, and the data tracking software outputs final results. The process is iterative, such that all the algorithms update after each test is run to accommodate the newly acquired data, optimization groupings may be updated based on the latest data, and new advertisements are developed for the next round of testing, all of which enacts a continuous process of optimization.

When the optimization process of the present invention is executed, performance of the advertising account improves, often substantially. The data tracking software can be customized for each account, or even for specific tests within an account, to optimize for different performance metrics (e.g., KPIs) or other desired outcomes. With the improved performance metrics provided by the present invention, the overall quality of a digital advertising account is improved, and a substantial return on investment from these improvements is furnished to a user.

Accordingly, the combination of elements of the present invention provides improved advertising performance by improving ad copy, reliably and at scale, improved performance across an entire account, including long tail areas that are often ignored (e.g., units of the account that do not get a lot of traffic or data that are generally ignored because there is not sufficient data for testing in them individually). In particular, each of the components outlined above is useful alone, however, these components are synergistic, such that the combination of components provides amplifying benefits of the others and unlocks capabilities that couldn't be realized without combining them in the manner implemented by the present invention. Additionally, the present invention reduces the operational overhead of data management and assessment when testing new advertisements. The present invention enables the ability to test many new advertisements in parallel to optimize performance quickly and continuously (generally this amounts to the number of new advertisements developed and tested being one or more orders of magnitude greater than would be otherwise). The present invention optimizes the tradeoff between exploring new copy in testing, and getting the most value out of established "winner" advertisements from such tests (this is a variant of what is commonly referred to as the "exploration-exploitation dilemma" in statistics and information search more broadly).

FIGS. 1 through 7, wherein like parts are designated by like reference numerals throughout, illustrate an example embodiment or embodiments of improved technology and processes for advertisement optimization, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 illustrates an overview of how the system and process 100 of the present invention is implemented. In particular, FIG. 1 depicts a machine implemented process or method 100 for optimizing advertisement performance, by using advertisements that have been generated by a machine and optimized for performance by testing data tracked from running the machine generated advertisements. In accordance with one example embodiment of the present invention, the process 100 is applied to a pay-per-click advertising account (PPC account) to improve account-wide performance according to key performance indicators (KPIs, e.g., click-through rates, conversion rates, cost-per-conversion, quality scores, etc.).

At step 102 the process 100 starts with assessing a digital advertising account (e.g., a PPC account) including the one or more ad units included within the account. In accordance with an example embodiment of the present invention, the assessing is performed for the entire account, and includes an assessment of a keyword organizational structure (i.e., how keyword search queries have been grouped into campaigns and ad groups) and assessing all historical data for all advertisements (within the one or more ad units) that have ever been run in the advertising account. In particular, at step 102, the system analyzes keyword organizational structure and historic data of one or more historical advertisements associated with the one or more ad units in the digital advertising account to calculate performance data indicating relative effectiveness of specific copy elements that appeared in the historical advertisements.

At step 104 the system performs a motivational analysis for each of the one or more ad units to identify any motivational trigger words or phrases in the one or more historical advertisements associated with the one or more ad units that are associated with one or more motivations, and thereby identify the one or more motivations associated with each of the one or more ad units. A motivational analysis is run for each ad unit, using software that computes motivations from publicly available text data, as explained in greater detail with respect to FIG. 4. The motivational assessment includes matching the words and phrases within the advertisements and identifying the words and phrases that match motivational trigger words or phrases stored within a motivational database. The motivational trigger words or phrases represent words and phrases that have been previously determined to associate with motivations of a given target audience.

At step 106 the system divides up the one or more ad units and groups into sets of optimization groupings based on intersecting motivations identified from the one or more motivations. In particular, the system divides up and groups ad units (e.g., campaigns & ad groups) into a set of optimization groupings (groupings of ad units that provide coherent sets of keywords with targeted KPI parameters) based on similar motivational characteristics, as explained in greater detail with respect to FIG. 2. In accordance with an example embodiment of the present invention, the results of the motivational analyses in step 104 are used to determine how similar the psychological motivations are of each of the target audiences that will be viewing advertisements from each of the ad units, and thus determine coherency through motivational similarity (e.g., through a cluster analysis of the motivational profile data for all ad units). In addition to motivational coherence, the process for determining optimization groupings also takes historical performance data (e.g., KPI data) into account to guarantee that the final optimization groupings are suitable for a high-throughput testing process that is carried out as outlined in FIG. 6. Additionally, the system accounts for semantic coherence such that similar products, services, etc. are grouped together within the optimization groupings. Specifically, the semantic coherence is utilized to ensure that advertisements including dissimilar subject matter should not belong to the same optimization groupings. For example, advertisements that share similar motivational coherence and statistical properties but are directed to subject matter (according to a semantic coherence analysis) of high heels and power drills, respectively, will not be grouped within the same optimization grouping. Those of skill in the art will appreciate that while the description above indicates using KPI data particular to PPC accounts, and psychological data gleaned from publicly available text, the present invention can be implemented using many alternative forms of data, such as in-store purchasing data (e.g., CRM data), or psychological data gleaned from direct reports or imputed from behaviors rather than text, and that the present invention is by no means intended to be limited to the particular embodiment described.

At step 108, in accordance with one example embodiment of the present invention, once the one or more ad units in the account are broken into optimization groupings, the process 100 creates predictive scoring models by training of machine learning models utilizing data from the optimization groupings, the predictive scoring models, and motivational assessments. In particular, machine learning models include the predictive scoring models (e.g., naïve Bayes models) that are trained up on historical performance data (e.g., KPI data) for each optimization grouping, as discussed in greater detail with respect to FIG. 3. Additionally, at step 108, a final motivational assessment is done for each optimization grouping. The final motivation assessment is similar to the assessment performed in step 104. The assessment performed at step 108 is executed for each entire optimization grouping as a whole, each of which may include many account units (e.g., ad groups). This in contrast to the assessment performed in step 104 which is executed for all ad units individually before creating the optimization groupings. Once the ad units are grouped (at step 106), the system can redo the same kind of assessment performed in step 104 but for the optimization groupings themselves, so it is representative of the entire optimization group. Both of these processes (predictive scoring models and motivational assessments) yield ad copy elements (e.g., n-grams) that the system will use as raw materials for generating new ads for each optimization grouping.

Continuing with step 108, in accordance with an example embodiment of the present invention, natural language generation algorithms (e.g., Markov chains) are also trained up on how the ad text of ad copy is stylized across the account (and in digital advertising accounts generally) to specify how the different ad copy elements should be combined to create well-formed advertisements in their entirety.

At step 110 the system identifies a collection of ad copy elements to be used in new advertisements for each of the optimization groupings based on the results of step 108. In particular, the ad copy elements are identified based on a combination of training results resulting from an input of the performance data and the one or more motivations by aggregating the specific copy elements having relatively greater effectiveness according to the performance data and motivational trigger words or phrases associated with the one or more motivations.

Additionally, at step 110, the system generates a plurality of new machine-generated advertisements for each of the optimization groupings utilizing the aggregated specific ad copy elements. In particular, the software then generates advertisements according to the data provided from trained-up natural language generation algorithms (from step 108), specifically, using the ad copy elements it has identified for each optimization grouping. As would be appreciated by one skilled in the art, the machine-generated advertisements may be further manipulated to achieve various other desirable outcomes.

At step 112 the system adds the plurality of new machine-generated advertisements to one or more ad units within the optimization groupings. Additionally, at step 112 the system performs the high-throughput testing process utilizing the historical advertisements and the plurality of new machine-generated advertisements within the optimization groupings. In accordance with one example embodiment of the present invention, once the advertisements are created and finalized they are stored within ad units of the digital advertising account, and the high-throughput testing process is initiated, as discussed in greater detail with respect to the process 600 of FIG. 6. As would be appreciated by one skilled in the art, there are many ways to store the advertisements into the digital advertising account, including writing through an API, or using bulk tools (e.g., bulk upload spreadsheets), and this process is managed by the system.

Figure 6:
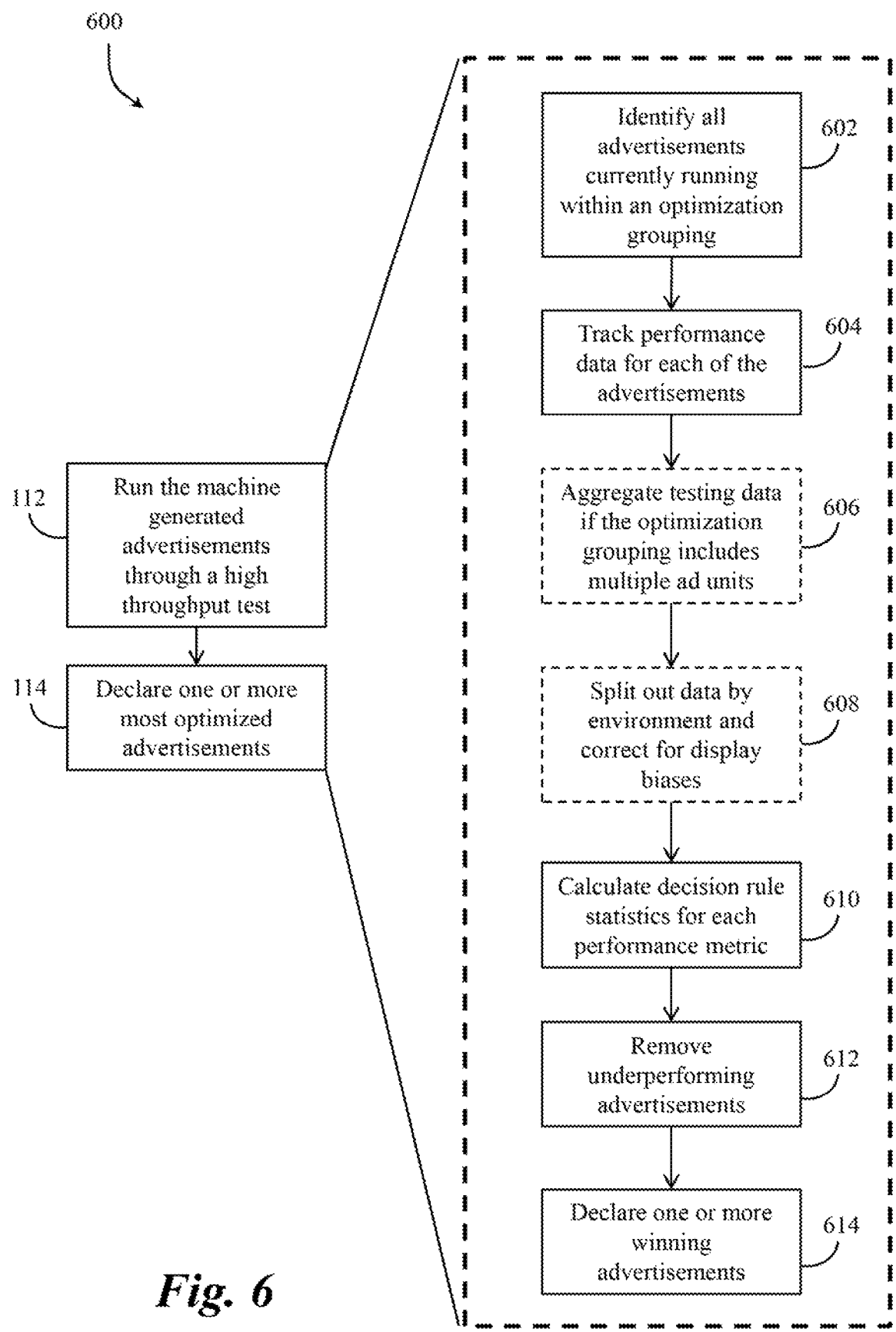
FIG. 6 is an illustrative flowchart depicting the process for evaluating the machine-generated advertisements, in accordance with aspects of the invention.

As soon as the advertisements go live, a customized data tracking software initiates the high throughout testing to track, collect, and aggregate performance data (e.g., KPI data) as needed to manage the testing process, as performing in FIG. 6. In short, the system continuously tracks the performance data as it becomes available, and continuously calculates decision-rule statistics (e.g., parametric significance tests) that are used to determine which ads to pause and when. As certain decision-rule criteria are met as performance data is updated, the system flags and pauses advertisements that are thusly determined to be the lowest-performing advertisements. This pausing of lowest-performing advertisements occurs continuously, until only the top performing advertisement(s) remains, at which point the final advertisement(s) is declared the winner and final results are reported (step 114). Those of skill in the art will appreciate that while the description above indicates using KPI data and statistical decision-rules such as significance test thresholds, the present invention can be implemented using many alternative forms of ad performance data, such as traditional advertising ROI metrics like sales, and using many different decision-rule criteria and ad pausing logics, such as Bayesian cost functions, and that the present invention is by no means intended to be limited to the particular embodiment described.

At step 114, the system determines a result of the high-throughput testing, the result including at least one top performing advertisement for each of the one or more ad units within the optimization groupings. In particular, testing is performed to score the advertisements using the predictive scoring models for the appropriate optimization grouping. Additionally, the process 100 can stop at step 114 or continue to train and optimize utilizing the results provided in step 114, as described in steps 116 and 118. In particular, depending on the circumstances and the results of the process 100, any of the steps individually, in combination, or all of the steps of the process 100 can be repeated, potentially iteratively indefinitely. The process 100 is designed to be iterative at every level because the digital advertising environment is dynamic and is constantly evolving. For example, the steps of the process 100 may be iterated until a final set of advertisements for each optimization grouping is produced with desired parameters and properties (e.g., sufficient number of advertisements, sufficient variance in ad copy elements across ads, predicted aggregate performance of each set of ads, etc.). Those of skill in the art will appreciate that while the description above indicates using KPI data and ad copy elements particular to PPC accounts or derived from motivational data, the present invention can be implemented using many alternative forms of data or sources of ad copy elements, such as any other form of data related to ad quality (e.g., metrics related to advertising ROI from ads run offline), or ad copy elements that have been pulled from various other sources such as advertising agency submissions, and that there are many different kinds of natural language generation algorithms that could be used to generate new ads, and that the present invention is by no means intended to be limited to the particular embodiment described.

Optionally, at step 116, the system updates the advertisement assessment models to incorporate the performance data results of the high-throughput testing. In particular, utilizing the results of the high throughput test, the system can update the assessment models utilized throughout the process 100 with the performance data yielded from the testing (e.g., steps 102-106 and as utilized in FIG. 2).

Optionally, at step 118 the system utilizes the "winning" advertisement(s) as seeds to generate new advertisements in the next iteration of the process 100. In particular, the top performing advertisements are utilized within the algorithms to create new machine-generated advertisements in future iterations of the process 100. More specifically, the overall optimization process 100 provided in FIG. 1, can be applied iteratively (all feedback arrows in FIG. 1). The results from testing new advertisements can be incorporated into the machine-learning algorithms to discover new, even better performing advertisements, and the winning advertisements can be used to seed the next round of advertisements creation, either by heavily weighting the newly incorporated data from testing, or by using techniques like genetic algorithms, whereby the winning advertisements (e.g., top performers in the testing done at step 114) become the predecessors of the next generation of advertisements, which are 'mutated' to create new variants. As discussed herein, each of the steps of the process 100 can be repeated iteratively, depending on the specific circumstances of the user, advertising account, etc.

Figure 2:
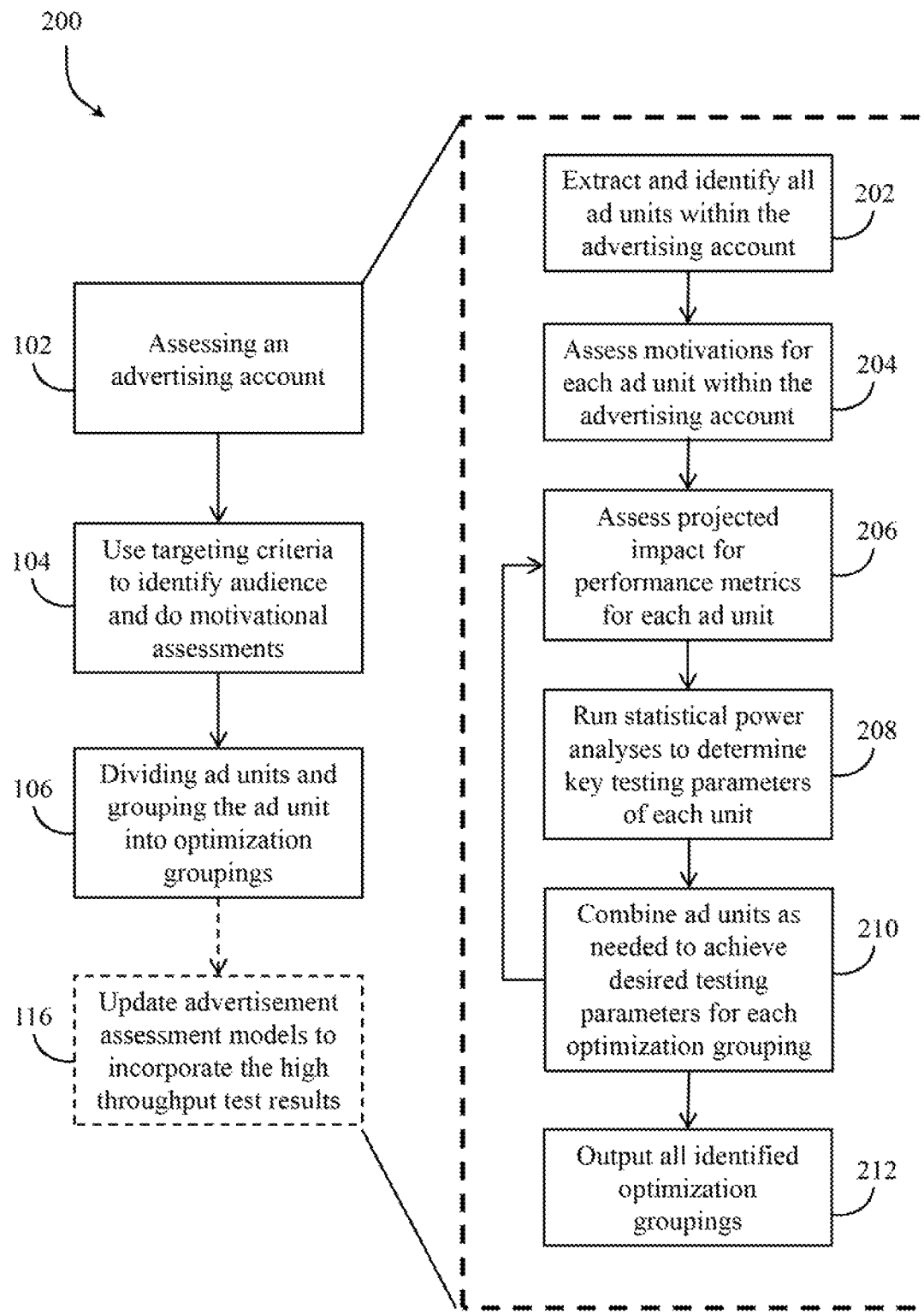
FIG. 2 is an illustrative flowchart depicting the process for creating optimization groupings, in accordance with aspects of the invention.

FIG. 2 illustrates a process 200 of assessing a digital advertising account (e.g., a PPC account) to create the optimization groupings (e.g., steps 102-106 of FIG. 1). In particular, FIG. 2 depicts the process 200 in which the system uses data from digital advertising accounts to create optimization groupings (collections of one or more units, e.g., a set of ad groups, in an account for testing), using both important data requirements (e.g., number of impressions) and motivational alignments (e.g., people that search for keywords in one ad group have similar motivations as people that search for keywords in a related ad group).

In accordance with an example embodiment of the present invention, at step 202, all of the data is first read in from a customer's digital advertising account and each of the one or more ad units (e.g., campaigns and ad groups) are identified. For example, the system extracts the advertisements, keywords, and historical performance metrics from the advertising account utilizing an application program interface (API) or through database calls. Additionally, at step 202, the system identifies all the ad units within the advertising account. The identification process includes identifying information used as targeting criteria for a relevant audience (e.g., keywords) and historical performance data for all of the ad units (e.g., click-through-rates, conversion rates, etc.) for each ad unit. For example, keyword data from the account is utilized to define a target audience (e.g., a representative group of people that will use the keyword search terms in a query, and thus will be viewing the machine-generated advertisements). The historical performance data will be utilized for scoring each of the advertisements based on their respective performance metrics (e.g., KPIs). The purpose of the functions performed in step 202 is to identify the structure of the digital advertising account and the elements related to the account structure.

At step 204 the system performs an initial motivational analysis for every ad unit extracted from of the account. An example implementation for how the motivational analysis is performed is discussed in greater detail with respect to FIG. 4. In short, the target audiences for each ad unit are identified (e.g., via email lists of customers for products, publically available data from social media, etc.) and motivations for the target audiences are determined through a motivational analysis. Step 204 helps to create and organize the optimization groupings according to considerations of motivational coherence or similarity, however, other criteria of coherence or similarity could be used instead, such as semantic similarity of keywords in the different account units, similarity of KPIs, etc.

At step 206 the system assesses the projected impact for performance metrics for each of the ad units. In particular, at step 206, the system utilizes projected impact models, to make projections about expected performance improvements (e.g., for the various KPIs), based on historical performance data from previous advertisements being run. More specifically, the projected impact for performance metrics are assessed by utilizing projection models that incorporate historical performance data for how the system has impacted such metrics previously, historical performance data of the ad units, and an assessment of an overall quality of the current advertisements being run within the ad units (e.g., by comparing existing ad copy with ad copy stored within the motivational word bank) to predict the impact that new advertisements would have on the ad unit. The projected impact assessment utilizes proprietary mathematical functions for projecting the final outcome before the advertisements are implemented and go live. This function is based on historical data on the outcomes when the system and process has been applied elsewhere, however, as would be appreciated by one skilled in the art, there are many ways one could predict the final results. In accordance with an example embodiment of the present invention, the projected impact models are continuously updated as more work is done, in all accounts under management, so that they provide the most accurate possible predictions for expected performance from the optimization process.

At step 208 the system executes a statistical power analysis to determine key testing parameters of each ad unit. In particular, the statistical power analysis combine the projected impact model's predictions from step 206 with the existing historical performance data (e.g., KPIs, anticipated traffic volumes, etc.) for each ad unit (or optimization grouping), to provide an estimate of key parameters for testing (e.g., how many advertisements can be tested in an ad unit or optimization grouping simultaneously, how long testing will take, a number of advertisements that can be statistically evaluated in a predetermined period of time, etc.). As would be appreciated by one skilled in the art, the statistical power analysis can be performed utilizing various different kinds of statistical models and assumptions, and according to many parameters. For example, the target might be testing twenty advertisements in four weeks, using statistical significance thresholds of $p<0.05$ for three KPIs of interest, but all of those parameters can be varied according to precisely what one is trying to achieve, what statistical decision-making rules and/or parameters are used, etc.

At step 210 the one or more ad units within the advertising account are combined together into optimization groupings. Optimization groupings consist of a collection of one or more ad units in which an optimization will be conducted for the combination of the ad units. The determination for which ad units are combined into which optimization groupings is performed in a manner to obtain the desired testing parameters for an optimization grouping. The testing parameters can include both testing criteria (e.g., the ad units provide sufficient traffic volume to test twenty advertisements in two weeks) and share sufficient similarities (e.g., overlapping motivations or motivational coherence). In short, based on the results of the statistical power analysis and taking into consideration the motivational similarity for each ad unit, the digital advertising account is broken out into optimization groupings. Once an initial set of optimization groupings has been determined, the projected impact models from step 206 and the statistical power analyses from step 208 are re-run on all optimization groupings, including any created and ad units that have not yet been assigned to an optimization grouping, to create additional optimization groupings, change existing optimization groupings, etc. As would be appreciated by one skilled in the art, this process is repeated until all of the ad units within the digital advertising account have been assigning to optimization groupings.

At step 212 the finalized optimization groupings are then output from the system with key identifying information, testing parameters, etc. to guide next steps in the process 100. For example, the optimization groupings are output with key identifying information (e.g., which ad units are within the optimization grouping), expected performance (how much performance metrics like click-through-rates are expected to improve), and testing parameters (e.g., how many ads can be tested in a certain period of time). Those of skill in the art will appreciate that while the description above indicates using performance data particular to digital advertising accounts, and psychological data gleaned from publicly available text, the present invention can be implemented using many alternative forms of data, such as in-store purchasing data (e.g., CRM data), or psychological data gleaned from direct reports or imputed from behaviors, and that the present invention is by no means intended to be limited to the particular embodiment described.

Figure 3:
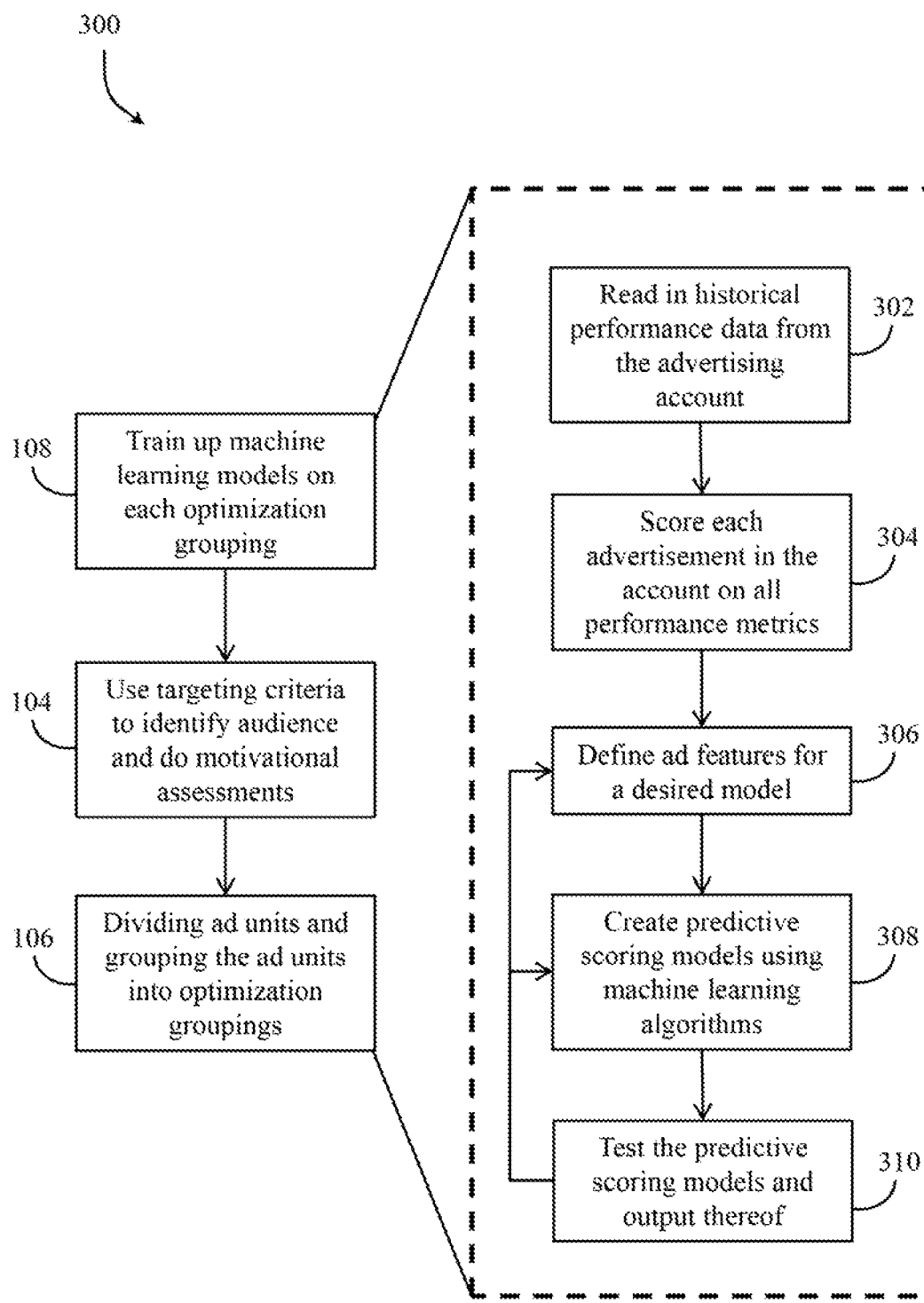
FIG. 3 is an illustrative flowchart depicting the process by which predictive scoring models for ad copy are built and trained, in accordance with aspects of the invention.

FIG. 3 illustrates a process 300 of building and training up the predictive scoring models through machine-learning algorithms (e.g., naïve Bayes) applied to the historical performance data and ad copy for the advertising accounts (e.g., PPC accounts). In other words, the process 300 provides the process 300 which determines which ad copy elements have been most effective by training machine learning algorithms on historical performance data of ad copy that has already been utilized within an advertising account. Additionally, the process 300 provides predictive scoring models that are utilized to evaluate the machine-generated advertisements, as discussed in FIG. 5.

In accordance with one example embodiment of the present invention, at step 302, all of the data is first read in from a digital advertising account (e.g., PPC account) and all of the one or more ad units (e.g., campaigns and ad groups) that were ever run in the advertising account are identified. The historical performance data for all of the identified ad units are extracted including where in the account the ad units were run, what keywords the ad units were run with, and all related performance data for those ad units (e.g., the click-through-rates). For example, system extracts the advertisements, keywords, and historical performance metrics from the advertising account utilizing an application program interface (API).

At step 304 all of the one or more ad units and every advertisement within the advertising account that has ever been run in the account are scored on all performance metrics. The ad performance scoring process is configured to clean the raw data, structure the data properly, scale the data appropriately, and normalize the data. The ad performance scoring can involve anything from simply assigning the relevant data to every advertisement, to normalizing the data for every advertisement based on the keyword(s) the advertisement was paired with, to creating aggregate indexes that combine, and/or manipulate various performance metrics (e.g., KPIs). In accordance with an example embodiment of the present invention, the performance data for each ad unit and/or advertisement is turned into a score value. For example, the score can be a difference score between a performance of an advertisement and a median performance for all advertisements within the advertising account (or ad unit or optimization grouping) or can be a score indicating an over or under performing advertisement.

At step 306, the advertisement features are then defined for a desired predictive model. The features can be defined both narrowly and broadly as ad copy components (e.g., n-grams) in many varied instantiations, typically constrained by what kind of model the features are going to be used in, as well as what the desired output of the model is. For example, a feature may indicate the presence/absence of an word or phrase (e.g., n-gram), the presence of a word or phrase (e.g., an n-gram) paired with a particular keyword, the presence of a word or phrase (e.g., an n-gram) in a specific part of an advertisement, or the entire first line of an ad in a particular ad unit, and so on.

At step 308 machine-learning algorithms (such as naïve Bayesian classifiers) are utilized to build predictive scoring models for the advertisements within each optimization grouping. For example the machine learning algorithms can include a combination of probabilistic classifiers, neural networks, linear regression models, etc. The predictive scoring models are built for scoring advertisements based on the features defined in step 306. As would be appreciated by one skilled in the art, the predictive models can be built for an entire digital advertising account, for specific ad units, for individual advertisements, or a combination thereof. Additionally, the predictive scoring algorithms yield predicted probabilities at any desired level of specificity for how any existing or new advertisement might perform, for example, against a specific keyword, or within a broader optimization grouping, or even across the entire digital advertising account.

At step 310, after the creation of the predictive scoring models, the predictive scoring models are tested for accuracy against data from the advertising account that was not included in the data used to train up the predictive scoring models. In accordance with an example embodiment of the present invention, the model testing process requires withholding some of the historical performance data when training the model so that the model can later be tested for effectiveness. For example, the model testing process can include utilizing 80% of the performance data for training and withholding 20% of the performance data for testing. The testing performed in step 310 provides an estimated accuracy of the predictive power of each model (e.g., a percentage of correct predictions, proportion explained variance, etc.). Depending on the results of step 310, the process 300 may be iterated by going back to defining the ad features (step 306) and/or training up the models (step 308), until a desired final outcome is achieved for the final predictive scoring models.

Figure 5:
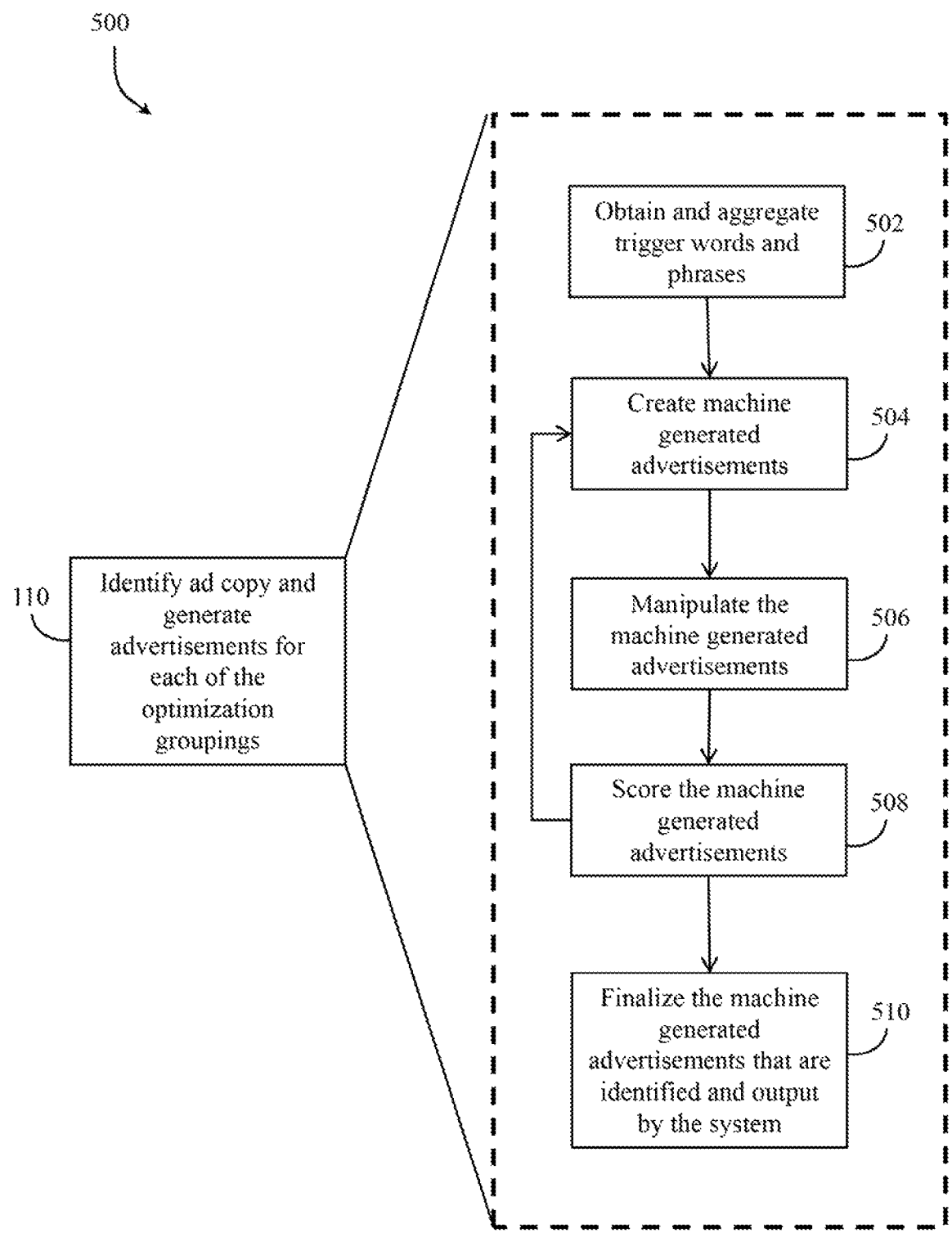
FIG. 5 is an illustrative flowchart depicting the process for creating machine-generated advertisements, in accordance with aspects of the invention.

In addition to outputting a predictive scoring model, step 310 also extracts ad copy elements that are likely to be high-performing for the advertisement generation process, as discussed in greater detail with respect to FIG. 5. Those of skill in the art will appreciate that while the description above indicates using KPI data particular to PPC accounts, and highlights specific machine-learning algorithms (e.g., naïve Bayes), the particular data that could be used to train such predictive scoring models could instead be other kinds of ad performance data, and there are a very wide variety of machine-learning algorithms that could be used to train up predictive scoring algorithms such as neural networks, and all of these different variations can also be combined; the present invention is by no means intended to be limited to the particular embodiment described.

Figure 4:
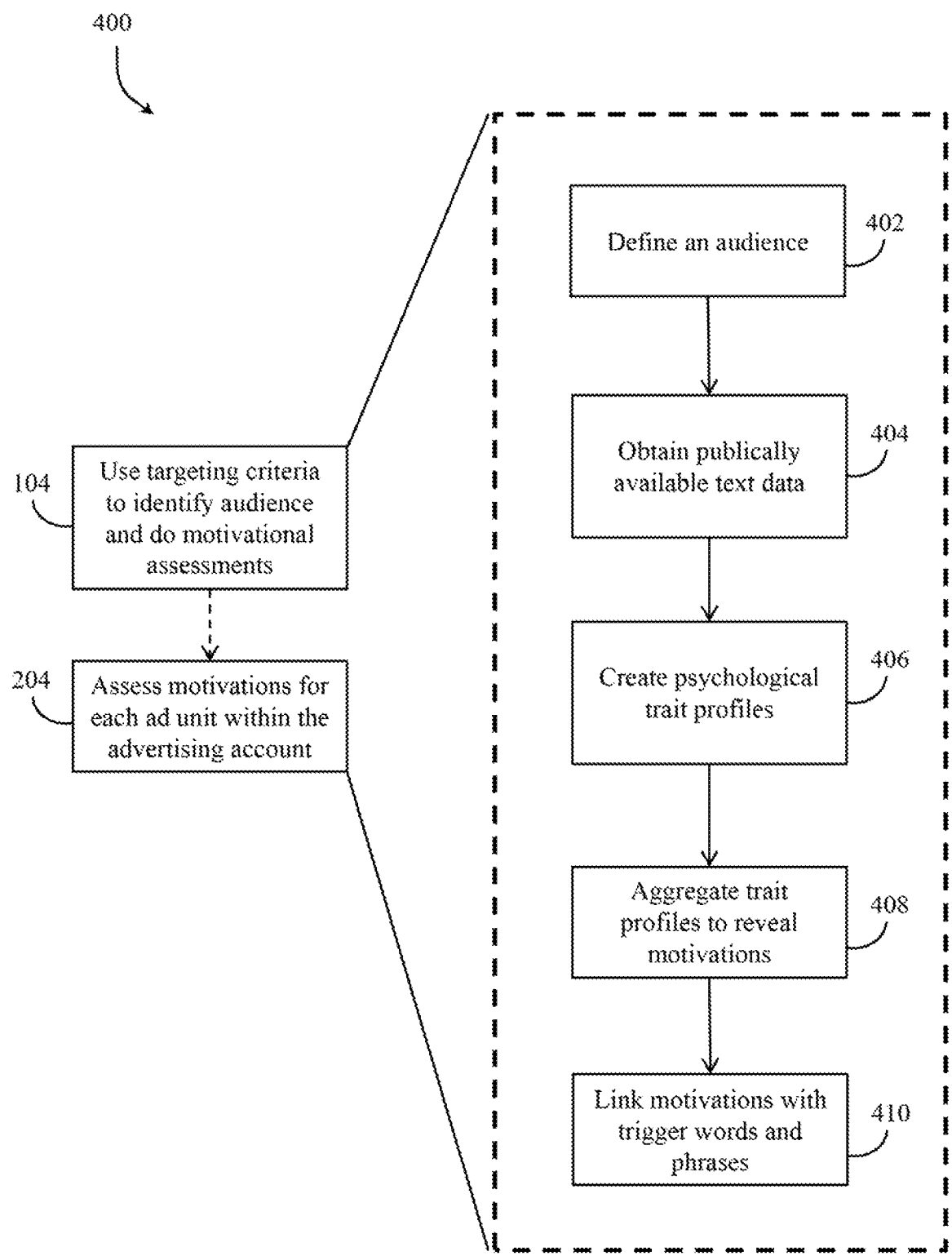
FIG. 4 is an illustrative flowchart depicting the process for determining psychological traits and motivations of a target audience, in accordance with aspects of the invention.

FIG. 4 illustrates a process 400 for generating the motivational analysis for all of the optimization groupings. At step 402 a target audience is defined and identified. The defining and identifying of the target audience can be performed at any level of granularity, from very narrow (e.g., defining a target audience for a single keyword) to very broad (e.g., defining a target audience for an entire advertising account). As would be appreciated by one skilled in the art, an audience can also be defined in many different ways, such as using signals from publicly available data and Internet traffic patterns to define and identify an audience (e.g., people that are talking about a specific product related to a keyword on social media), to getting a list of emails of customers that are known to have purchased a specific product related to the keyword, or using social media identifiers of brand loyalists for the company affiliated with a PPC advertising account. In ideal cases, the audience is well defined as highly likely to correspond to precisely the people (or kinds of people) that would search the keywords in a given optimization grouping, but this is not a hard requirement.

At step 404 the system uses the identifiers of the defined target audience, and obtains publicly available text data from those individuals. In accordance with an example embodiment of the present invention, keyword data associated with the target audience is utilized to identify individuals within the audience and locate publicly available text data for those individual (e.g., via, emails, social media identifiers, etc.). As would be appreciated by one skilled in the art, publically available text data can be obtained from a variety of sources and using variety of methods. For example, text data can be obtained from social media accounts associated with individuals or from other big data sources.

At step 406, the text data obtained in step 404 is then fed through a combination of natural language processing algorithms. In accordance with an example embodiment of the present invention, the text data is fed through natural language processing algorithms that have been trained up to impute psychological trait scores (psychological traits are measurable individual differences in behavior, thought, emotion, etc. that tend to be stable across time and context, and that map onto motivations, preferences, decision-making styles, etc.) from quantitative variables related to patterns of language use (e.g., the ratio of nouns to verbs). The results of the natural language processing algorithms provide and/or are utilized to build out psychological trait profiles for all identified individuals within the target audience.

At step 408, after psychological trait profiles are created for all possible individuals in the target audience, the profiles are aggregated (e.g., averaged, median is extracted, etc.) and compared to population norms (e.g., population averages, medians, etc.) on every trait measured to reveal the driving motivations of the target audience. In particular, for each trait (e.g., in a psychological trait database) in the aggregated profiles for all of the individuals creates an aggregate trait score (e.g., an arithmetic average of the population) for that group of individuals. In other words, at step 408, the system differentiates the difference between the target audience and a broader population of users. The group-level traits that deviate sufficiently from the norm are identified as motivators of that audience. An example implementation for revealing the driving motivations of the target audience is discussed in greater detail in U.S. patent application Ser. No. 14/190,407 (US20140257990) which is incorporated herein by reference. As would be appreciated by one skilled in the art, the differences between groups can be determined in many different ways. For example, they can be determined mathematically, such as by comparing their arithmetic means, comparing their medians, or even comparing the variance of the two distributions.

At step 410 each of the motivators or motivations identified in step 408 are linked with trigger words and phrases (e.g., as stored in a motivation database containing associations between trigger words and phrases for motivations). In particular, each motivation stored within the system is associated with large banks of trigger words, phrases, and images that are known to appeal to people with the specific motivation. Additionally, the trigger words and phrases are used to seed the ad copy elements for the advertisement generation, as discussed in greater detail with respect to FIG. 5 and can be utilized in the ad scoring for motivational alignment discussed with respect to FIG. 2. Those of skill in the art will appreciate that while the description above explains a method for identifying a target group of people and assessing their shared motivations, there are obviously many ways to identify a target audience, and many alternative ways to assess their motivations or identify words and phrases that might activate these motivations, such as through questionnaires or ethnographic research, and that the present invention is by no means intended to be limited to the particular embodiment described.

FIG. 5 illustrates a process 500 and automated system for creating machine-generated advertisements with predictable performance through software. In particular, the process 500 utilizes the words and phrases derived in the processes discussed in FIGS. 3 and 4 to be utilized as raw material in the machine generation of advertisements.

At step 502 the system obtains and aggregates trigger words and phrases (e.g., n-grams as provided by the steps 310 and 410 in FIGS. 3 and 4, respectively) to be utilized in ad copy of the machine-generated advertisements. In particular, the trigger words and phrases are obtained and aggregated from a combination of sources and utilizing a combination of methodologies including but not limited to the data obtained from the account history (e.g., from step 310), from a global account history, custom words or phrases provided by a user into the system, and the motivational word banks (e.g., from step 410). As would be appreciated by one skilled in the art, the trigger words and phrases can come from any language corpus (e.g., marketing materials, social media content, etc.) with the appropriate properties for the task, and that are believed to be suitable for producing high-quality ad copy.

Continuing with step 502, in accordance with one example embodiment of the present invention, trigger words or phrases that are determined to be likely to produce top performing advertisements are fed into the advertisement generation software. In an example embodiment, these trigger words and phrases are derived from the predictive scoring models that identify trigger words and phrases that have previously performed well (e.g., at step 310) in an optimization grouping, an advertising account (PPC), multiple advertising accounts, or elsewhere, as well as trigger words and phrases associated with the key motivations (i.e., trigger words and phrases) that were identified for a target audience at step 410 (and which were discovered in previous proprietary research). As would be appreciated by one skilled in the art, other types of media can be utilized in place of or in combination with the words or phrases. For example, the system can be configured to implement similar processes and systems to utilize images (e.g., image-based ads like on Instagram), sound clips (e.g., radio ads), etc.

At step 504 the system creates machine-generated advertisements utilizing the trigger words and phrases from step 502. In particular, the advertisement generation software utilizes natural language generation algorithm(s) (e.g., Markov chains) that have been trained on linguistic data and performance data (e.g., KPI) from the targeted digital advertising account (e.g., PPC account), specific optimization grouping, and other sources to produce a plurality of machine-generated advertisements. The natural language generation algorithm(s) are trained to develop how the trigger words and phrases should be placed together in a meaningful manner (e.g., as shown in step 310 and FIG. 3). In particular, the natural language generation algorithms are trained up on linguistic data specific to the environment in which the advertisements will be run. The training process teaches the algorithms how to stylize the text (e.g., create coherent phrases, sentences, etc.) in the digital advertising environment, but it does not teach the algorithms what text elements should be used to create such ads At step 506 the advertisements are further manipulated to fit any other desired outcomes (e.g., inserting specific promotions). For example, the advertisements can be modified to fit a specific advertisement format (e.g., user specified character requirements), fit a specific goal (e.g., include a user specific promotion), filter out unacceptable ad copy, provide human review, etc.

At step 508 the machine-generated advertisements are then run through the predictive scoring models (e.g., created at in the process of 300) and each advertisement is given a predicted performance score. The predictive scoring models can include different criteria based on the performance discussed with respect to FIG. 3 and the motivational assessment discussed with respect to FIG. 4. In accordance with an example embodiment of the present invention, the steps 504-508 are iterated until a specific desired outcome is achieved, such that the advertisements can be generated (step 504), manipulated (step 506), and scored (step 508) repeatedly, until a final set of machine-generated advertisements is produced that meets specific criteria (e.g., number of new ads, variance in ad copy elements across ads, variance in predicted performance, aggregate predicted performance for a set of ads, etc.).

At step 510 the final set of machine-generated advertisements are extracted from the larger set of all the machine-generated advertisements produced in the process 500, and output by the system. The final set of machine-generated advertisements can be output either directly into the digital advertising account (e.g., to PPC account through an API, database calls, etc.), or into intermediate formats (e.g., bulk upload sheets) to be reviewed or uploaded into the digital advertising account in other ways. Those of skill in the art will appreciate that while the description above explains a method for using software to create machine-generated advertisements based on copy derived from historical KPI performance data and motivational analyses, the source text could come from various other places not specified here (e.g., copy writers, comic strips, presidential speeches, etc.), and many kinds of natural language generation algorithms could be used (often referred to as NLG algorithms), and that the present invention is by no means intended to be limited to the particular embodiment described.

FIG. 6 provides a high-throughput testing process 600 used by the system to identify the highest performing advertisement(s) from the finalized set of machine-generated advertisements (produced in the process 500). In accordance with one example embodiment of the present invention, the high-throughput testing process 600 is performed through parallel testing of as many advertisements in an optimization grouping that the statistical power analyses (e.g., from step 208) determine can be run. The high-throughput testing process 600 will continuously evaluate the advertisements and sequential removal of the lowest-performing advertisements until only a predetermined number of top performing or "winning" advertisements remain. In accordance with an example embodiment of the present invention, the system utilizes binomial z-statistics with resampling methods to derive a statistical reliability/confidence.

At step 602 the system identifies all the advertisements currently running within an optimization grouping of a digital advertising account (e.g., a PPC account). For example, once the machine-generated advertisements have been added to a digital advertising account from the process 500 in FIG. 5, the data tracking software identifies all relevant advertisements to be monitored, including specifying any baselines or other special types of advertisements (e.g., short-term promotions).

At step 604 the system tracks performance data for each of the advertisements in the optimization grouping. In particular, once the advertisements are identified in step 602, the system immediately begins tracking all relevant live performance data (e.g., KPI data) for each advertisement.

At step 606 the system optionally manages any data aggregation process. In particular, if an optimization grouping includes more than one ad unit, the system will aggregate the tracked performance data (e.g., data from multiple ad groups) being tracked at step 604. Additionally, at step 606, the system re-calculates particular performance metrics (e.g., click-through-rates, conversion rates, etc.) and other novel metrics derived from the aggregated data (e.g., net revenue). The re-calculations provide a comprehensive view of results for the entire high throughput testing process 600.

At step 608 the process 600 optionally performs a splitting process to separate data from multiple different environments. In particular, if advertisements are running in different environments with different statistical profiles (e.g., mobile vs. desktop, or Google Search vs. Google Search Partners), the system splits out data from these different sources, a ratio for each advertisement showing in multiple environments is computed, performance data within each environment is calculated separately to correct for biases (e.g., mathematically correcting for the fact that one ad is showing 3:1 on mobile vs. desktop while another is 1:1), and the data can be recombined so that all advertisements have stats for a same ratio (e.g., average).

In addition to continuously track the data for all ads in an optimization grouping, as performed in step 604, the system also continuously calculates, updates, and/or monitors any key decision-rule statistics at step 610. In particular, as data is measured during the high-throughput testing process 600, statistical metrics (e.g., statistical significance) are calculated continuously to identify statistically-reliable over performing and underperforming advertisements. The statistics are calculated against both the baseline advertisement (if there is one) as well as for all other aggregated advertisements in the high-throughput testing process 600. As would be appreciated by one skilled in the art, the system can utilize a combination of different methods, other than statistical significance thresholds, to compute meaningful statistics, for example, the system can utilize Bayesian methods, which do not rely on significance thresholds.

At step 612 the system performing scoring and advertisement removal of underperforming advertisements. In particular, the system applies decision-rule statistics (e.g., statistical significance at some defined threshold) that are utilized by the system to continuously pause (and/or flag for review/pausing), remove, and/or turn off the lowest-performing advertisements as defined by the decision-thresholds.

At step 614 the system declares one or more top performing advertisements as the winning advertisement(s). In particular, once the one or more top performing advertisements remain(s) after continuously turning off the lowest-performers in step 612, the top performing advertisement(s) is/are declared the "winner", and the final results from the testing phase of the optimization process are output by the system. In accordance with an example embodiment of the present invention, the "winning" advertisement(s) are added to the ad units of the respective optimization groupings to be the advertisement(s) utilized for the digital advertising account, thus optimizing the performance of the advertisement(s) in the digital advertising account. Those of skill in the art will appreciate that while the description above explains a method for using software to track data during the testing phase of the optimization process in the digital advertising account, the scope remains wide for what specific performance data is to be tracked, what decision rules for pausing ads are to be used, etc., and different kinds of data such as purchasing data, or different decision rules such as Bayesian cost functions could be used to implement a similar "last man standing" approach to ad testing; the present invention is by no means intended to be limited to the particular embodiment described.

The process provided in FIG. 6 provides an improvement over conventional advertisement testing methodologies and systems. Specifically, almost universally, current advertisement testing methods and "best practices" involve running limited numbers of a small scale tests (e.g., two advertisements and two baseline advertisements) in a highly constrained environment over a pre-defined period of time and only looking at all the data for all ads at the end to make a decision. In contrast, the process of the present invention begins with a test with a significantly larger population of advertisements than a conventional process would deem fit, and then exploiting the way that data comes in, with different KPIs providing more information than others more quickly. The high-throughput testing process exploits these properties to test lots of advertisements, and rather than waiting for results and determining a winner, the process determines winners through a "last-man standing" process, in which the lowest-performing ads are continuously paused as enough data is obtained to do so, based on the KPIs that provide the most information to date, until only one (or a couple ads remain).

In operation, the system of the present invention is enabled to create a virtually, for all practical purposes, unlimited number of machine-generated ads with predictably high performance. Two core capabilities enable the system to perform such functions. The core capabilities include the ability of the system to rapidly and efficiently produce numerous high-quality advertisements (e.g., through the steps of FIG. 5) and the utilization of the predictive scoring models (e.g., provided in FIG. 3) that are able to reliably predict how well the advertisements will perform.

Figure 7:
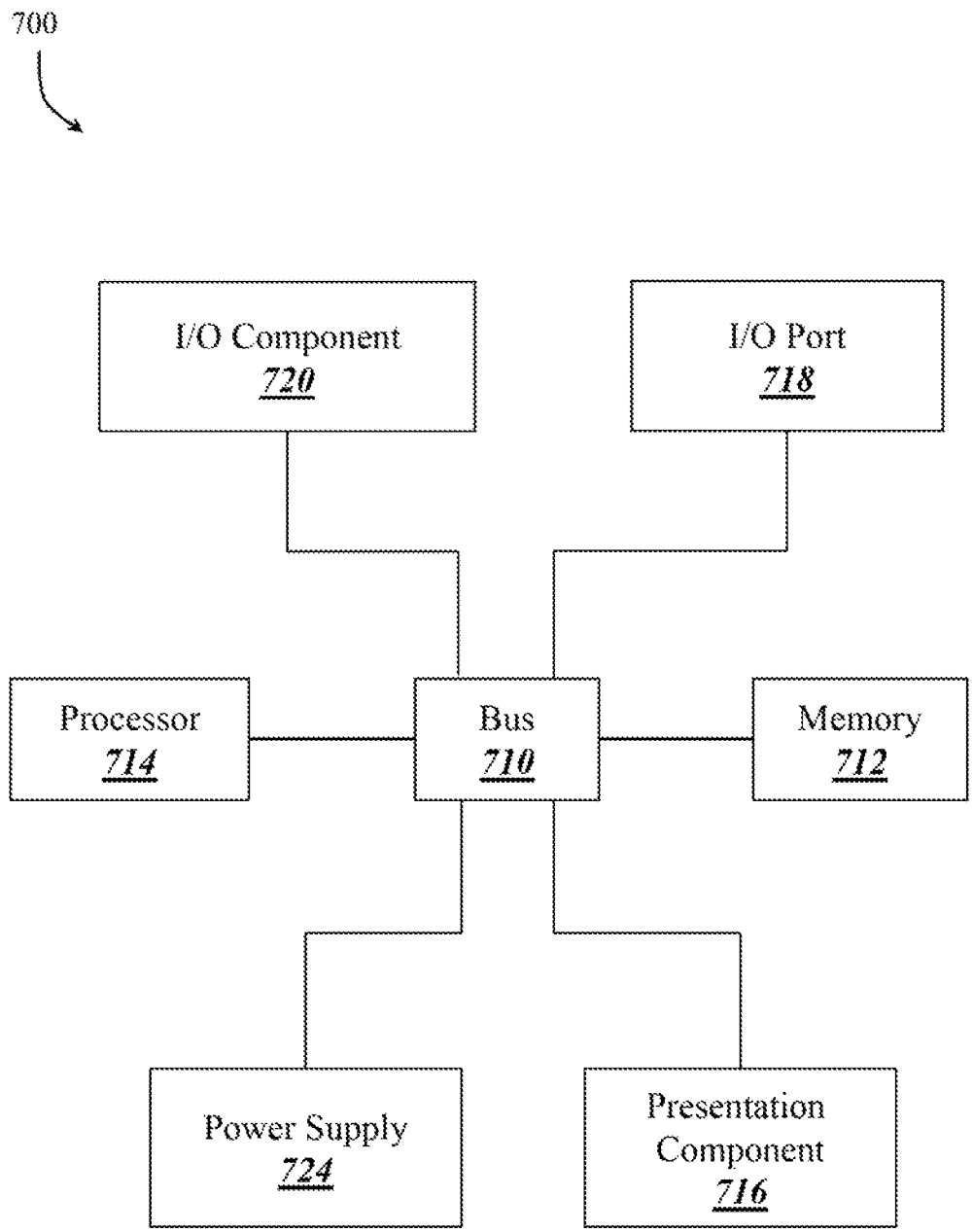
FIG. 7 is a diagrammatic illustration of a high level architecture for implementing processes in accordance with aspects of the invention.

Any suitable computing device can be used to implement the system and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 700 is depicted in FIG. 7. The computing device 700 is merely an illustrative example of a suitable computing environment and in no way limits the scope of the present invention. A "computing device," as represented by FIG. 7, can include a "workstation," a "server," a "laptop," a "desktop," a "hand-held device," a "mobile device," a "tablet computer," or other computing devices, as would be understood by those of skill in the art. Given that the computing device 700 is depicted for illustrative purposes, embodiments of the present invention may utilize any number of computing devices 700 in any number of different ways to implement a single embodiment of the present invention. Accordingly, embodiments of the present invention are not limited to a single computing device 700, as would be appreciated by one with skill in the art, nor are they limited to a single type of implementation or configuration of the example computing device 700.

The computing device 700 can include a bus 710 that can be coupled to one or more of the following illustrative components, directly or indirectly: a memory 712, one or more processors 714, one or more presentation components 716, input/output ports 718, input/output components 720, and a power supply 724. One of skill in the art will appreciate that the bus 710 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 7 is merely illustrative of an exemplary computing device that can be used to implement one or more embodiments of the present invention, and in no way limits the invention.

The computing device 700 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 700.

The memory 712 can include computer-storage media in the form of volatile and/or nonvolatile memory. The memory 712 may be removable, non-removable, or any combination thereof. Exemplary hardware devices are devices such as hard drives, solid-state memory, optical-disc drives, and the like. The computing device 700 can include one or more processors that read data from components such as the memory 712, the various I/O components 716, etc. Presentation component(s) 716 present data indications to a user or other device. Exemplary presentation components include a display device, speaker, printing component, vibrating component, etc.

The I/O ports 718 can enable the computing device 700 to be logically coupled to other devices, such as I/O components 720. Some of the I/O components 720 can be built into the computing device 700. Examples of such I/O components 720 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A machine-generated method producing numerous ad elements, comprising:
    assessing, using a processing unit, a digital advertising account comprising one or more ad units, the assessing comprising:
        analyzing keyword organizational structure and historic data of one or more historical advertisements associated with the one or more ad units in the digital advertising account to calculate performance data indicating effectiveness of specific copy elements that appeared in the one or more historical advertisements;
    performing a motivational analysis for each of the one or more ad units to identify motivational trigger words or phrases comprising n-grams in the one or more historical advertisements associated with the one or more ad units that are associated with one or more motivations, and thereby identify the one or more motivations associated with each of the one or more ad units, wherein performing the motivational analysis comprises:
        defining a target audience using one or more of: keyword, advertising account data, signals from publicly available data, internet traffic patterns, emails of customers, purchases of a product, or social media identifiers;
        aggregating publically available text data for users included in the target audience,
        creating psychological trait profiles for each of the users using the publically available text data and natural language processing trained to impute psychological trait scores from quantitative variables related to patterns,
        aggregating trait profiles and comparing to population norms to derive motivations, determined mathematically by traits that deviate from the population norms, for each of the users, linking the derived motivations for each of the users with the motivational trigger words and phrases comprising n-grams stored in a motivation database containing associations between trigger words and phrases for motivations; grouping the one or more ad units into sets of optimization groupings based on intersecting motivations from the one or more motivations;

identifying a collection of ad copy elements to be used in generating new advertisements for each of the optimization groupings based the performance data and the one or more motivations by aggregating the specific copy elements having greater effectiveness according to the performance data and motivational trigger words or phrases comprising n-grams associated with the one or more motivations;

generating a plurality of new machine-generated advertisements for each of the optimization groupings utilizing the aggregated specific copy elements and natural language generation algorithms trained on linguistic data specific to an advertising environment;

adding the plurality of new machine-generated advertisements to one or more ad units within the optimization groupings;

performing a high-throughput testing process utilizing the one or more historical advertisements and the plurality of new machine-generated advertisements within the optimization groupings; and determining a result of the high-throughput testing, the result comprising a final set of machine-generated advertisements are extracted from a larger set of all of the plurality of new machine-generated advertisements produced and including at least one top performing advertisement for each of the one or more ad units within the optimization groupings, and outputting the final set into the digital advertising account.

2. The method of claim 1, wherein the assessing further comprises a processing unit configured using one or more of an application program interface (API) or database calls assessing keyword organizational structure and historical data for all advertisements previously run for the digital advertising account.

3. The method of claim 1, further comprising training predictive scoring models with historical data for each of the optimization groupings, wherein machine-learning algorithms comprising one or more of probabilistic classifiers, neural networks, or linear regression models are utilized to build predictive scoring models.

4. The method of claim 3, further comprising performing another motivational analysis for each of the optimization groupings.

5. The method of claim 4, wherein the collection of ad copy elements are used as raw materials for generating the plurality of new machine-generated advertisements for each of the optimization groupings.

6. The method of claim 5, further comprising training natural language generation algorithms to determine how text is stylized in the plurality of new machine-generated advertisements.

7. The method of claim 6, further comprising generating the plurality of new machine-generated advertisements based on the trained natural language generation algorithms.

8. The method of claim 1, further comprising:
updating assessment modules to incorporate the result of the high-throughput testing; and
utilizing the at least one top performing advertisement as a seed for generating future machine-generated advertisements.

9. The method of claim 1, wherein performing the motivational analysis further comprises:
defining a target audience;
aggregating publically available text data for users included in the target audience;
creating psychological trait profiles for each of the users using the publically available text data and natural language processing algorithms trained to impute psychological trait scores from quantitative variables related to patterns of language use and psychological traits that are measurable individual differences in one or more of behavior, thought and emotion, wherein each psychological trait is stored in at least a psychological trait database; aggregating psychological trait profiles and comparing to population norms comprising one or more of population averages, arithmetic means, medians, and variance of two distributions, wherein a system differentiates a difference between the target audience and a broader population of users to derive motivations, determined mathematically by traits that deviate from the population norms, for each of the users; and linking the derived motivations for each of the users with the motivational trigger words and phrases comprising n-grams obtained and aggregated utilizing a combination of methodologies and from a combination of sources comprising one or more of: data obtained from the account history, a global account history, custom words or phrases provided by a user, marketing materials, social media content and motivational word banks to be utilized in the collection of ad copy elements, with each motivation stored within the system and associated with banks of trigger words, phrases, and images related to people with a specific motivation.

10. The method of claim 1, wherein the high-throughput testing further comprises:
manipulating the plurality of new machine-generated advertisements to satisfy a predetermined advertisements format or user specified goal;
scoring the plurality of new machine-generated advertisements and the one or more historical advertisements for a predicted performance; and
filtering out advertisements from the plurality of new machine-generated advertisements and the one or more historical advertisements that are predicted to perform poorly based on the predicted performance.

11. The method of claim 1, wherein the high-throughput testing process comprises:
identifying all of the plurality of new machine-generated advertisements and the one or more historical advertisements in each of the optimization groupings;
tracking performance metrics for each of the new plurality of machine-generated advertisements and the one or more historical advertisements in each of the optimization groupings;
aggregating test data from the performance metrics;
identifying over performing and underperforming advertisements by continuously calculating decision-rule statistics for each of the performance metrics;
removing the underperforming advertisements and continuing the high-throughput testing process for the remaining advertisements of the new plurality of machine-generated advertisements and the one or more historical advertisements until a final predetermined number of advertisements remain; and identifying the final predetermined number of advertisements as the at least one top performing advertisement.

12. A system producing numerous machine-generated ad elements, the system comprising:
a processing unit configured to assess a digital advertising account comprising one or more ad units, the assessing comprising:
analyzing keyword organizational structure and historic data of one or more historical advertisements associated with the one or more ad units in the digital advertising account, obtained using a networking device and/or storage devices, to calculate performance data indicating effectiveness of specific copy elements that appeared in the one or more historical advertisements;
performing a motivational analysis, using the processing unit, for each of the one or more ad units to identify motivational trigger words or phrases comprising n-grams in the one or more historical advertisements associated with the one or more ad units that are associated with one or more motivations, and thereby identify the one or more motivations associated with each of the one or more ad units, wherein performing the motivational analysis comprises:
defining a target audience using one or more of: keyword, advertising account data, signals from publicly available data, internet traffic patterns, emails of customers, purchases of a product, or social media identifiers;
aggregating publically available text data for users included in the target audience,
creating psychological trait profiles for each of the users using the publically available text data and natural language processing trained to impute psychological trait scores from quantitative variables related to patterns,
aggregating trait profiles and comparing to population norms to derive motivations, determined mathematically by traits that deviate from the population norms, for each of the users,
linking the derived motivations for each of the users with the motivational trigger words and phrases comprising n-grams stored in a motivation database containing associations between trigger words and phrases for motivations;
grouping the one or more ad units into sets of optimization groupings based on intersecting motivations from the one or more motivations;
a processing unit configured to identify a collection of ad copy elements to be used in new advertisements for each of the optimization groupings based the performance data and the one or more motivations by aggregating the specific copy elements having greater effectiveness according to the performance data and motivational trigger words or phrases associated with the one or more motivations;
a processing unit configured to generate a plurality of new machine-generated advertisements for each of the optimization groupings utilizing the aggregated specific copy elements and natural language generation algorithms trained on linguistic data specific to an advertising environment;
a processing unit configured to add the plurality of new machine-generated advertisements to one or more ad units within the optimization groupings;
a processing unit configured to perform a high-throughput testing process utilizing the one or more historical advertisements and the plurality of new machine-generated advertisements within the optimization groupings; and
a processing unit configured to determine a result of the high-throughput testing, the result comprising a final set of machine-generated advertisements are extracted from a larger set of all of the plurality of new machine-generated advertisements produced including at least one top performing advertisement for each of the one or more ad units within the optimization groupings, and output the final set into the digital advertising account.

13. The system of claim 12, wherein a processing unit is configured to assess using one or more of an application program interface (API) or database calls, and wherein the assessing further comprises assessing keyword organizational structure and historical data for all advertisements previously run for the digital advertising account.

14. The system of claim 12, wherein a processing unit is configured to train predictive scoring models with historical data for each of the optimization groupings, wherein machine-learning algorithms comprising one or more of probabilistic classifiers, neural networks, or linear regression models are utilized to build predictive scoring models.

15. The system of claim 14, wherein a processing unit is configured to perform another motivational analysis for each of the optimization groupings.

16. The system of claim 15, wherein the collection of ad copy elements are used as raw materials for generating the plurality of new machine-generated advertisements for each of the optimization groupings.

17. The system of claim 16, wherein a processing unit is configured to train natural language generation algorithms to determine how text is stylized in the plurality of new machine-generated advertisements.

18. The system of claim 17, wherein a processing unit is configured to generate the plurality of new machine-generated advertisements based on the trained natural language generation algorithms.

19. The system of claim 12, wherein a processing unit is configured to:
update assessment modules to incorporate the result of the high-throughput testing; and
utilize the at least one top performing advertisement as a seed for generating future machine-generated advertisements.

20. The system of claim 12, wherein performing the motivational analysis comprises:
defining a target audience;
aggregating publically available text data for users included in the target audience;
creating psychological trait profiles for each of the users using the publically available text data and natural language processing algorithms trained to impute psychological trait scores from quantitative variables related to patterns of language use and psychological traits that are measurable individual differences in one or more of behavior, thought and emotion, wherein each psychological trait is stored in at least a psychological trait database;
aggregating psychological trait profiles and comparing to population norms comprising one or more of population averages, arithmetic means, medians, and variance of two distributions, wherein a system differentiates a difference between the target audience and a broader population of users to derive motivations, determined mathematically by traits that deviate from the population norms, for each of the users; and linking the derived motivations for each of the users with the motivational trigger words and phrases comprising n-grams obtained and aggregated utilizing a combination of methodologies and from a combination of sources comprising one or more of: data obtained from the account history, a global account history, custom words or phrases provided by a user, marketing materials, social media content and motivational word banks to be utilized in the collection of ad copy elements, with each motivation stored within the system and associated with banks of trigger words, phrases, and images related to people with a specific motivation.

21. The system of claim 12, wherein the high-throughput testing further comprises:

manipulating the plurality of new machine-generated advertisements to satisfy a predetermined advertisements format or user specified goal;

scoring the plurality of new machine-generated advertisements and the one or more historical advertisements for a predicted performance; and filtering out advertisements from the plurality of new machine-generated advertisements and the one or more historical advertisements that are predicted to perform poorly based on the predicted performance.

22. The system of claim 12, wherein the high-throughput testing process comprises:

identifying all of the plurality of new machine-generated advertisements and the one or more historical advertisements in each of the optimization groupings;

tracking performance metrics for each of the new plurality of machine-generated advertisements and the one or more historical advertisements in each of the optimization groupings;

aggregating test data from the performance metrics;

identifying over performing and underperforming advertisements by continuously calculating decision-rule statistics for each of the performance metrics;

removing the underperforming advertisements and continuing the high-throughput testing process for the remaining advertisements of the new plurality of machine-generated advertisements and the one or more historical advertisements until a final predetermined number of advertisements remain; and identifying the final predetermined number of advertisements as the at least one top performing advertisement.

* * * * *